United States Patent Office 3,382,049
Patented May 7, 1968

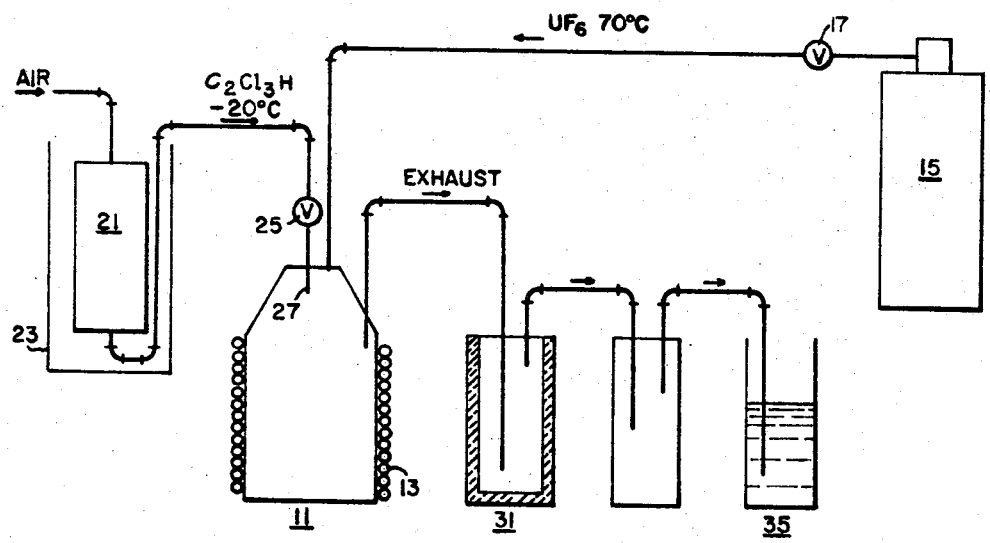

3,382,049
METHOD FOR PRODUCING URANIUM TETRAFLUORIDE
Benedict L. Vondra, Greensburg, Pa., and John A. Ward, Jr., Wilmington, N.C., assignors to Nuclear Materials and Equipment Corporation, Apollo, Pa., a corporation of Pennsylvania
Filed Jan. 27, 1965, Ser. No. 428,379
4 Claims. (Cl. 23—353)

ABSTRACT OF THE DISCLOSURE

Highly dense $UF_4$ substantially free of carbon is produced by reacting $UF_6$ from tank 15 and $C_2Cl_3H$ from chamber 21 in reactor vessel 11 at a low temperature. At this low temperature the $C_2Cl_3H$ is cracked instead of being decomposed with release of carbon.

---

This invention relates to the producing of uranium tetrafluoride ($UF_4$) and has particular relationship to the conversion of uranium hexafluoride ($UF_6$) into $UF_4$.

$UF_6$ is a gas and $UF_4$ is a solid. Typically the solid serves for producing uranium metal. For this purpose $UF_4$ in the form of a powder is reacted with calcium or magnesium to derive uranium metal. It is desirable that the powder particles be dense; spongy particles produce a spongy metal and it is an object of the invention to provide a method and apparatus for producing a dense $UF_4$ powder.

In accordance with the teachings of the prior art $UF_4$ is produced by reacting $UF_6$ at a temperature of about 300° F. with trichloroethylene ($C_2Cl_3H$). Trichloroethylene is liquid at room temperature but has a very high vapor pressure like chloroform. Trichloroethylene vaporizes at about 87° C. Typically the following reactions take place between $C_2Cl_3H$ and $UF_6$:

(1) $\quad 2UF_6 + C_2Cl_3H \rightarrow C_2Cl_3F_3 + 2UF_4 + HF$
(2) $\quad UF_6 + C_2Cl_3H \rightarrow C_2Cl_3F_2H + UF_4$ Probably in an excess of $UF_6$ Equation 2 is convertible into Equation 1 because of the following reaction:

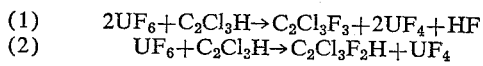

Equation 1 produces a ratio of .209 of $C_2Cl_3H$ to $UF_4$ and Equation 2 a ratio of .418.

The $UF_4$ which the prior-art practice has produced has been porous and has produced spongy metal uranium. It is an object of this invention to overcome this deficiency of the prior art and to produce dense $UF_4$ from which dense uranium metal free of sponginess shall be derivable.

This invention arises from the discovery that dense $UF_4$ is produced by reacting $UF_6$ with $C_2Cl_3H$ at a low temperature, substantially lower than 87° C. Specifically the dense $UF_4$ is produced by reacting the $UF_6$ with a cold fog of liquid particles of $C_2Cl_3H$ projected into the reactor chamber by an aspirator.

The novel features considered characteristic of this invention are described above. For a better understanding of this invention, both as to its organization and as to its method of operation, together with additional objects and advantages thereof, reference is made to the following description taken in connection with the accompanying drawing in which the single figure is a diagrammatic view of apparatus for practicing this invention.

The apparatus shown in the drawing includes a reactor chamber 11. This chamber is provided with cooling coils 13 which maintain the chamber at a low temperature typically —50° C. The apparatus also includes a supply of $UF_6$ which may be a cylinder 15 of $UF_6$. This cylinder 15 is connected to the reactor chamber 11 through a conventional pressure regulating valve 17. The $UF_6$ is supplied at room temperature, typically 70° C. This apparatus also includes a source of $C_2Cl_3H$ which is maintained in a pressure chamber 21 in a low-temperature container 23. Air typically at 80 pounds per square inch pressure is supplied to maintain the $C_2Cl_3H$ under pressure. The $C_2Cl_3H$ which is in the liquid phase is injected into the reactor chamber 11 through a pressure regulating valve 25 and an aspirator or fog nozzle 27. The $C_2Cl_3H$ is supplied typically at about —20° C.

The nozzle 27 typically may be a TEEJET spray nozzle sold by Spraying Systems Co. of 3201 Randolph St., Bellwood, Ill. Nozzles of this type are described in U.S. Patent 2,666,669. A spray nozzle which has been found to be suitable for operation with the input pressure at 80 pounds per square inch produces a spray at its orifice which is conically shaped and has a spray angle of 73°. At pressure of 80 pounds per square inch .85 gallon per hour of $C_2Cl_3H$ is supplied.

The apparatus further includes a freeze-out trap 31 connected to receive the gases exhausted from chamber 11. In trap 31 liquid or solid products of the reaction such as excess $C_2Cl_3H$ and $UF_6$ and $C_2Cl_3F_3$ or $C_2Cl_3F_2H$ and any $UF_4$ carried over may be frozen out. The residual gases and solids are passed through a water chamber 35 in which the hydrogen fluoride and other materials may be dissolved out.

In the practice of this invention $UF_6$ and $C_2Cl_3H$ are supplied together. The valve 17 may be set from observation as the reaction proceeds so that there is a high rate of production of $UF_4$ in the chamber 11 and the $UF_4$ has the desired density. Preferably an excess of $C_2Cl_3H$ is supplied.

Examples

The following table covers two runs in which $UF_4$ was produced in the practice of this invention:

| Duration | First Run 10 Minutes | Second Run 10 Minutes |
|---|---|---|
| Total $C_2Cl_3H$ supplied (cc.) | 410 | 410 |
| Rate of supply of $C_2Cl_3H$ (cc./min.) | 41 | 41 |
| $C_2Cl_3H$ recovered (cc.) | 130 | 124 |
| $C_2Cl_3H$ used (cc.) | 280 | 286 |
| Mass of $C_2Cl_3H$ used (gm.) | 376 | 384 |
| $UF_4$ recovered (gm.) | 1,136 | 1,410 |
| Ratio—$C_2Cl_3H/UF_4$ | .332 | .272 |
| Total U in $UF_4$ (percent) | 75.35 | 75.50 |
| Total $U^{+4}$ in $UF_4$ (percent) | 74.45 | 74.10 |
| Total $U^{+6}$ in $UF_4$ (percent) | .9 | 1.4 |
| Carbon content (percent) | >.1 | (1) |
| $UF_6$ in freeze-out trap 31 (gm.) | 5 | (1) |
| U in $H_2O$ chamber 35 (gm.) | 1 | (1) |

¹ Not measured.

The $UF_4$ produced was highly dense and substantially free of any porous particles.

For a better understanding of this invention the following summary is presented:

This invention is a low cost novel method of producing anhydrous uranium tetrafluoride of high quality by reaction of trichloroethylene and uranium hexafluoride and includes apparatus for practicing this method. The reaction between the $C_2Cl_3H$ and the $UF_6$ results in the cracking of an unsaturated hydrocarbon by removal of two fluoride atoms from the $UF_6$ and the formation of $UF_4$ and organic by-products. The $UF_4$ product from this process is suitable for the production of uranium dioxide ($UO_2$) or uranium metal. The $UO_2$ derived from this $UF_4$ exhibits the fabrication and sintering characteristics of a low bulk-density, high surface area (4–6 m.²/g.) $UO_2$ which is produced by the conventional ammonium diuranate practice. Uranium metal from this $UF_4$ can be produced using the standard calcium reduction technique. The metal is of good quality and of a high yield. The production of both oxide and metal can be achieved by use of the $C_2Cl_3H$—$UF_6$ process at a considerable cost reduction through the elimination of one or more processing steps.

In accordance with the teachings of the prior art the $C_2Cl_3H$—$UF_6$ reaction is accomplished by contacting hot (300° F.) trichloroethylene with gaseous $UF_6$ in a spray tower. The $UF_4$ is removed by filtering and the excess organic material is recycled back to the tower. This prior-art process is unsatisfactory for the following reasons:

(1) The $UF_4$ is not produced in a dry powdered form. The cake must be removed from the excess trichloroethylene by filtering and dried without moisture pickup.

(2) The $UF_4$ produced has a high carbon content >3% and is unsatisfactory for further use in either the oxide or metal process.

(3) The process is not amenable to continuous operations since the recycle organic contains trichloroethylene and organic by-products of a Freon nature.

The process according to the inventor has been successfully demonstrated in a bench-scale reactor at a production rate of 6 kg. per hour. The success of this process is dependent upon the manner in which the trichloroethylene is introduced into the reactor vessel 11 and the temperature of the trichloroethylene at the time of reaction. By controlling these variables, the reaction is instantaneous, stoichiometrically complete, substantially carbon free and requires no external heat or catalyst for completion.

In the practice of this invention successful operation has been achieved with a fog nozzle 27 which produced a trichloroethylene fog of particles having diameters of 20–30 microns; the trichloroethylene feed temperature was −20° C. or below. The density of the $UF_4$ can be varied as function of temperature and of rate of reaction. The density can be increased by lowering the rate and temperature, e.g., at −50° C. a 20% increase in density is obtained.

The advantages of this process over the prior-art methods are as follows:

(1) The $UF_4$ is produced as a dry powder requiring no additional processing steps.

(2) The $UF_4$ contains less than .1% free carbon. This results from maintaining the trichloroethylene at a low temperature to eliminate or minimize the thermal decomposition of the trichloroethylene and take advantage of the reducing properties only. The carbonaceous by-products are then discharged from the system as a gas freeing the $UF_4$ from any residual organic material.

(3) The process is adaptable to continuous operation since the $UF_4$ can be removed on a continuous basis and no organic recycle is necessary.

We claim as our invention:

1. The method of converting $UF_6$ into $UF_4$ which comprises reacting $UF_6$ with $C_2Cl_3H$, at a temperature so low that the $C_2Cl_3H$ is cracked by removal of two fluorine atoms from the $UF_6$ without substantial formation of free carbon.

2. The method of converting $UF_6$ into $UF_4$ which comprises reacting $UF_6$ with $C_2Cl_3H$, at a temperature so low that the $C_2Cl_3H$ is cracked by removal of two fluorine atoms from the $UF_6$ without any substantial formation of free carbon, the said $UF_6$ and $C_2Cl_3H$ being reacted at about −50° C.

3. The method of converting $UF_6$ into $UF_4$ which comprises reacting $UF_6$ with $C_2Cl_3H$, at a temperature so low that the $C_2Cl_3H$ is cracked by removal of two fluorine atoms from the $UF_6$ without any substantial formation of free carbon, the said $UF_6$ and $C_2Cl_3H$ being reacted in a reactor vessel maintained at a low temperature of about −50° C., to which said $UF_6$ is supplied from a source maintained at a temperature of about 70° C. and said $C_2Cl_3H$ from a source maintained at a low temperature of −20° C.

4. The method of claim 2 wherein the $C_2Cl_3H$ is supplied as a spray of particles having a diameter of the order of 20 to 30 microns.

References Cited

Baker, et al.: AECD K–1271 (1956), pp. 4–6, 10 and 11.

CARL D. QUARFORTH, *Primary Examiner.*

L. DEWAYNE RUTLEDGE, *Examiner.*

S. TRAUB, R. L. GRUDZIECKI, *Assistant Examiners.*